United States Patent [19]

Menault et al.

[11] 4,129,451
[45] Dec. 12, 1978

[54] SPINNABLE CELLULOSE SOLUTION AND PROCESS FOR MAKING SAME

[75] Inventors: Jacques Menault, Charbonnieres les-Bains; Henry Rodier, Sainte-Foy-les-Lyon, both of France

[73] Assignee: Rhone Poulenc Textile, Paris, France

[21] Appl. No.: 815,852

[22] Filed: Jul. 14, 1977

[30] Foreign Application Priority Data

Jul. 16, 1976 [FR] France .................. 76 22030
Jul. 16, 1976 [FR] France .................. 76 22032

[51] Int. Cl.² .............................................. C08L 1/24
[52] U.S. Cl. .................. 106/168; 106/163 R
[58] Field of Search ............... 264/187, 188; 106/163, 106/168; 8/116.4

[56] References Cited

U.S. PATENT DOCUMENTS

| 3,236,669 | 2/1966 | Williams | 106/163 |
| 3,706,526 | 12/1972 | Swidler et al. | 8/116.4 |
| 4,022,631 | 5/1977 | Turbak et al. | 106/168 |
| 4,028,132 | 6/1977 | Liff et al. | 106/163 R |
| 4,044,090 | 8/1977 | Portnoy | 106/163 R |

Primary Examiner—Jay H. Woo
Attorney, Agent, or Firm—Murray & Whisenhunt

[57] ABSTRACT

Spinnable, shapable solutions of celluose are disclosed, wherein the solutions contain native cellulose in a mixture of dimethylsulphoxide (DMSO) and formaldehyde. The cellulose has a degree of polymerization (DP) of at least 400 and a concentration in the mixture of at least 6% by weight, based on the volume of DSMO. The formaldehyde/cellulose weight ratio is 0.2 to 2, and the solutions have a water content no greater than 5,000 ppm by weight.

The solutions are obtained by dissolving the cellulose in a mixture of DMSO and formaldehyde, at a formaldehyde/cellulose weight ratio of at least 1, and thereafter the formaldehyde/cellulose weight ratio is reduced, if necessary, to the final level of about 0.2 to 2.

The solutions can be converted into films, membranes, sponges, varnishes, paints, and especially into filaments, with the filaments being generally similar in properties to regenerated cellulose filaments.

16 Claims, No Drawings

SPINNABLE CELLULOSE SOLUTION AND PROCESS FOR MAKING SAME

BACKGROUND OF THE INVENTION

The present invention relates to new cellulosic solutions which may be shaped to produce filaments, fibers, membranes, films, sponges and the like.

Previously used cellulose solvents were generally sulphuric acid and phosphoric acid, which tend to degrate the cellulose by causing severe hydrolysis, or complexes of heavy metals and amine compounds used in the cuprammonium process, which complexes are rather uneconomical to use because the solvent can not be recovered directly but only in an indirect and complicated manner.

The prior art has also known other solvent complexes or solvent mixtures for cellulose. Thus, the prior art has used ferric/tartrate complexes or mixtures of dimethyl-sulphoxide with dimethylacetamide or nitrogen dioxide, or sulphur dioxide and an amine. Because of major technical and/or economic problems, however, such complexes or mixtures have not lead to industrial spinning processes.

The most widely used spinning process includes an initial chemical conversion of the cellulose in order to produce a soluble intermediate product, cellulose xanthate, followed by a fresh chemical conversion to regenerate the cellulose. In such a process, significant consumption of chemical reactants, and especially a major loss of carbon disulphide, is involved.

Johnson et al, IPC Technical Paper Series of The Institute of Paper Chemistry, No. 5 (April 1975), report that they are able to dissolve cellulose, at very low concentrations, mainly 1 to 3% by weight/volume, in dimethylsulphoxide (DMSO) containing a large amount of formaldehyde relative to the amount of cellulose (on the order of 5 to 20 times the weight of the cellulose). Solutions of such low concentration are completely unsuitable for shaping on an industrial scale to produce filaments, fibers, membranes, films, sponges and the like, and the yield of the process of dissolving the cellulose is extremely low, because in most cases a large undissolved residue remains, which can represent up to 37% of the weight of the pulp, which is only employed at the rate of 1% relative to the DMSO. In addition, the high paraformaldehyde content interfers with the subsequent shaping operation. These authors teach that solutions of higher cellulose concentration can only be obtained from cellulose having a low degree of polymerization. As is known to the art, these celluloses of low degrees of polymerization are not found in the natural state, and can only be obtained by a prior chemical treatment of native cellulose, with consequential considerable increase in cost.

French Patent application No. 2,311,783, published on Dec. 17, 1976, claiming U.S. priority of an application filed on May 19, 1975, discloses a process for spinning solutions of cellulose in DMSO and formaldehyde. The French patent application describes solutions containing at least 0.8 parts by weight of aldehyde per part of cellulose, and 2 to 14% by weight of cellulose per volume of DMSO.

In order to dissolve a native cellulose, having a DP of at least 400, it is normally necessary to use a weight ratio of formaldehyde/cellulose of at least 1. At this formaldehyde content, however, it is difficult to effect further transformations of the solutions, and it is difficult to recover the majority of the formaldehyde used in the process.

SUMMARY OF THE INVENTION

Spinnable, shapable solutions of native cellulose according to the present invention are solutions of native cellulose and dimethylsulphoxide and formaldehyde. The cellulose has a degree of polymerization (DP) of at least 400 and a concentration in the solution of at least 6% by weight of cellulose per volume of dimethylsulphoxide. The formaldehyde is present in a formaldehyde/cellulose weight ratio of about 0.2 to 2, and the solution has a water content no greater than about 5,000 ppm by weight.

The solutions are produced by a process which comprises dissolving the cellulose, with the cellulose moisture content below about 1% by weight, in the DMSO and formaldehyde at a formaldehyde/cellulose weight ratio of at least 1. The formaldehyde/cellulose weight ratio is reduced, if necessary, after the dissolving step, to about 0.2 to 2, or better 0.2 to 0.8.

DETAILED DESCRIPTION OF THE INVENTION

Preferably the water content of the solution is no greater than 2,000 ppm by weight.

The DMSO preferably has a water content less than 1,000 ppm, prior to admixture with the other components of the solution. The DMSO water content will vary according to the accessibility of the cellulose which is to be dissolved therein, with the lower the cellulose accessibility the lower the water content of the DMSO.

The cellulose which is used in the solutions of the present invention is cellulose I, or "native cellulose" of any origin, such as, for example, cotton linters, wood pulp, pulp originating from other sources or even scrap material.

It is known that cellulose having a DP of less than 400 generally have inadequate physical properties to be successfully used in textile applications, and thus in almost all instances the cellulose used in the solutions of the present invention will have a DP of at least 400.

It is known to the art that the possibility of causing the cellulose molecules to react, or of solvating the cellulose molecules, is to a large part determined by the architecture in which the cellulose molecules are involved in the solid state. The art has characterized the ease of penetration of a reactant into the texture of a cellulose by making general resort to the concept of accessibility. Cellulose accessibility depends in a complex manner on the length of the chains of the cellulose, the mean DP, the size of the crystalline and amorphous zones and the fibrillar structure, which characterize the morphology of the cellulose fibers in question. The prior art has generally accepted the theory that thorough drying of a cellulose reduces its accessibility, because the cellulose-HOH-cellulose bond is more readily broken than is the cellulose-cellulose bond. However, in distinct contrast to this widely followed theory, the applicants have found that thorough drying of the cellulose to be dissolved, and preferably drying to a moisture content of less than 1% by weight, favors the dissolution of the cellulose in the DMSO/formaldehyde mixtures. In addition, the water content of the various ingredients of the solutions must be kept low. In particular, the lower the accessibility of the cellulose that is to be dissolved, the lower the water content of the various ingredients must be. This low level of water content of the various reactants is essential if it is desired at one and the same time to achieve complete and rapid dissolution and also obtain a solution containing very little, if any, gel, and having good spinnability. Thus, it is preferred to use anhydrous reactants, or to dry the reactants by known means prior to the production of the present solutions.

The starting cellulose is therefore chopped up into pulp or rendered into other suitable form, and dried to lower the water content to at most 1% by weight.

The formaldehyde which is used preferably contains no more than 4% by weight of water.

The DMSO which is used must be substantially anhydrous, or must previously been dried to a water content of generally less than 1,000 ppm of water, depending upon the particular cellulose starting material. Thus, to dissolve a cellulose originating from wood pulp or linters, for instances, and having a DP of 1,000 or more, it is generally preferred to use a DMSO having a water content of less than 500 ppm and preferably of less than 100 ppm.

For greater convenience of operation, it is preferred to use formaldehyde which is in the form of paraformaldehyde. The amount of paraformaldehyde necessary for the dissolving process must be such that the formaldehyde/cellulose weight ratio is at least 1, and preferably between 1 and 2.

The formaldehyde/cellulose weight ratio depends to a large extent upon the accessibility of the cellulose which is to be dissolved to form the solution. Thus, for certain native celluloses exhibiting relatively low accessibilities, a rather high formaldehyde/cellulose weight ratio will be utilized. In general, the formaldehyde/cellulose weight ratio will increase with a decrease of the accessibility of the cellulose which is to be employed.

It is advantageous to carry out the dissolving process at an elevated temperature, preferably of 90° to 130° C., although lower or higher temperatures could be used is desired. The use of such lower or higher temperatures does not provide any advantages, however. It is also preferred to heat the DMSO before introducing therein the cellulose which is to be dissolved.

The amount of cellulose in the solution is at least 6% by weight per volume of DMSO, that is, at least 60 grams of cellulose per liter of DMSO, and can be much larger, for example, 20% w/v or more, depending upon the subsequent use to which the solution is to be put.

In producing the solutions of the present invention, the starting cellulose is preferably chopped into pulp, dried to the water content of no greater than 1% by weight, and then is preferably pre-swollen in DMSO which has the necessary low water content. After the pre-swelling step, the paraformaldehyde may be added, and the temperature raised to the preferred dissolving range of about 90° to 130° C.

After the dissolving step is completed, the formaldehyde/cellulose weight ratio is reduced, if necessary, to a value of between 0.2 and 2, by removing the free formaldehyde, or formaldehyde combined with the cellulose. This formaldehyde removal can be by any known means, including driving off the formaldehyde by use of anhydrous, preferably inert, gas, or by distillation under reduced pressure. This step of reducing the formaldehyde content can be conducted without risk of forming gels or coagulation of the solution, provided that the formaldehyde/cellulose weight ratio remains at least as great as 0.2. After the formaldehyde/cellulose weight ratio has been reduced to the desired range, the amount of DMSO in the solution may be brought back to its original value.

It is strongly preferred that the solutions of the present invention have a formaldehyde/cellulose weight ratio of less than 0.8 and preferably between 0.2 and 0.6.

If a cellulose having a DP of less than 400 is used, such as cellulose II, possibly derived from waste products, it is possible to dissolve the cellulose with a formaldehyde/cellulose weight ratio of less than 1, and thus it may be possible to entirely dispense with the step of removing the excess formaldehyde. However, such celluloses having a DP of less than 400 are generally not suitable for the production of filaments having good physical properties. For this reason, the cellulose used in the solutions of the present invention will have a DP of at least 400, though celluloses of lower DP could also be used.

The solutions which are obtained are virtually free of undissolved fibers and free from gels, as can be confirmed by the two tests described hereinbelow.

The Np, or number of fibrous particles per cm3 of solution is determined by examination under a polarizing microscope. Counting is effected on the solution introduced into a rectangular microscope cell, using a magnification of 50×. Particles are counted if their diameter is greater than or equal to 25 microns. This test principally counts the undissolved fibers which form highly birefringent particles which are only slightly swollen, and of which the internal structure can be discerned in polarizing light, as well as certain more or less extensively swollen gels which are more or less birefringent and of which the internal structure can still be distinguished. The solutions are classified, depending upon the number of particles observed, as follows:

Np of 0 to 100 — excellent
Np of 100 to 200 — good
Np of 200 to 400 — good to satisfactory
Np greater than 400 — mediocre.

In addition to the particles counted by the Np method described above, the cellulose solutions can also contain very extensively swollen particles or gels which virtually have no detectable internal structure, have a refractive index very close to that of the surrounding medium, and are therefore quite difficult to detect by the Np test.

The extent of these gels can be accessed by measuring the clogging index value. This clogging index is determined by filtering the solution under a constant pressure of 2 bars through a filtering medium composed of three superposed assemblies, each composed of a stainless steel gauze of 34 microns mesh size and a stainless steel gauze of 0.610 mm mesh size.

The time of passage $t_1$ corresponding to the passage of a volume of 120 cm$^3$ of solution is determined and then the volume V, which passes through the filtering medium during a time of passage which is $4 \times t_1$ is measured. Clogging index is calculated, using the following equation:

$$I_c = 100 \; V/480$$

The solutions are classified, depending upon the clogging index value, $I_c$, obtained as follows:

$I_c$ of 90 to 100 — excellent
$I_c$ of 80 to 90 — very good $I_c$ of 60 to 80 — satisfactory
$I_c$ less than 60 — mediocre The solutions of the present invention are very good to excellent because the Np rarely exceeds 200 and does not reach a level of 250, and normally is less than 100, while the solutions have a clogging index value $I_c$ greater than 70, and normally greater than 80.

The solutions of the present invention can be shaped into filaments, fibers, membranes, films, sponges and the like by methods of shaping known to the art, or by the processes of the copending applications filed of even date herewith in the name of Henry Rodier, entitled "Process For Producing Cellulosic Shaped Articles", Ser. No. 815,850, and "Process For Producing Shaped Articles of Cellulose," Ser. No. 815,856, respectively, the disclosures of which are hereby incorporated by reference for the teachings of the use of the solutions of the present invention contained therein.

The step of dissolving a native cellulose, having a high DP, generally requires a weight ratio of formaldehyde/cellulose of at least 1, but solutions thus obtained are difficult to transform into filaments, and it is difficult to recover most of the formaldehyde involved. The resulting solutions can not be spun, for example, into a coagulating bath containing water and DMSO, using the process of the aforesaid copending application entitled "Process For Producing Shaped Articles of Cellulose."

The present application provides the advantage that the cellulose may be dissolved at the desired high weight ratio of formaldehyde/cellulose of 1 or more, but the formaldehyde content can be reduced, without risk of gel formation or of solution coagulation, as long as the formaldehyde/cellulose weight ratio stays at a level of 0.2 or greater. Solutions having a weight ratio of formaldehyde/cellulose of 0.2 to less than 1.0, and especially of 0.2 to less than 0.8, and most preferable from 0.2 to 0.6, are readily transformed into filaments by the spinning operation of the aforesaid copending application, and most of the formaldehyde involved in the process can be easily and cheaply recovered. Thus such solutions are preferred herein.

EXAMPLES OF THE INVENTION

In the following examples, which are provided for illustrating the invention without limiting it in any way, the parts and percentages are by weight, unless indicated otherwise.

EXAMPLE 1

80 Grams of sulfate pulp, viscose grade, having a DP of 450 and containing 6% of moisture, are dried in an oven to a moisture centent of less than 1%. The dried pulp is then introduced into 1,000 cm3 of DMSO, containing 550 ppm of water and 94 g of 96% strength paraformaldehyde, corresponding to a formaldehyde/cellulose weight ratio of 1.20. The mixture was heated to a temperature 130° C. over the course of 90 minutes with stirring, and was maintained at that temperature for 3½ hours, with continued stirring.

A solution having a viscosity of 520 poises at 20° C. is obtained, which is free from gels and undissolved cellulose ($I_c$ = 85; Np = 125). The solution can be spun by known methods into filaments suitable for technical applications.

EXAMPLE 2

80 g of sulphate pulp, viscose grade, having a DP of 450 and containing 6% moisture, was dried to moisture content of less than 1% and then introduced into 1,000 cm3 of DMSO containing 550 ppm of water and 94 g of 96% strength paraformaldehyde, corresponding to a formaldehyde/cellulose weight ratio of 1.20. The temperature of the mixture was raised to 130° C. over the course of 1 hour, with slow stirring, and then was maintained at 130° C. for 3 hours with further stirring. The dissolution of the cellulose, as observed under a polarising microscope, was complete. The viscosity of the solution was 550 poises at 20° C. The Np value was 90 and the clogging index $I_c$ was 87.

Dry nitrogen at 120° C. was then bubbled through the solution to reduce the formaldehyde/cellulose weight ratio of 0.25. The resulting solution, having a viscosity of 590 poises at 20° C., had an Np value of 85 and an $I_c$ value of 84. This solution was spinnable and could be cast into films.

EXAMPLE 3

80 g of sulphate pulp, viscose grade, having a DP of 450 and containing 6% by weight of moisture, were introduced into 1,000 cm3 of DMSO containing 100 ppm of water, and the mixture was left overnight at ambient temperature. A part of the DMSO was distilled to remove the water, and the volume was readjusted by the addition of DMSO to restore the original volume. The temperature was lowered to 130° C., and 94 g of 96% strength paraformaldehyde, corresponding to a formaldehyde/cellulose weight ratio of 1.20 was then added with stirring. The temperature was maintained for 3½ hours, with continued stirring.

The resulting solution had a viscosity of 510 poises at 20° C., and Np value of 95 and an $I_c$ of 90.

This excellent solution could be readily converted into filaments, films, membranes, sponges, etc., using conventional techniques.

EXAMPLE 4

80 g of bisulphite pulp, viscose grade, having a DP of 770 and containing 6% of water, was dried in an oven to a moisture content of less than 1%, and then introduced to 1,000 cm3 of DMSO containing 550 ppm of water. 94 g of 96% strength paraformaldehyde, corresponding to a formaldehyde/cellulose weight ratio of 1.20, were added to the mixture. The mixture was then heated to 130° C. over the course of 90 minutes, with stirring, and was maintained at that temperature for 3 hours with further stirring.

The resulting solution had a viscosity of 1,600 poises at 20° C. The number of undissolved particles Np was 60, and the clogging index $I_c$ was 75. This solution was very satisfactory when used to spin filaments suitable for textile applications.

EXAMPLE 5

The procedure of Example 4 was followed, but using a bleached kraft papermaking pulp having a DP of 1,050, and a moisture content of 6%. The DMSO which was used in this example contained 160 ppm of water.

A slightly cloudy solution was obtained, having a Np value of 210 and a clogging index $I_c$ of 78. The solution, which had a viscosity of 2,100 poises at 20° C., was spinnable.

EXAMPLE 6

80 g of bleached kraft pulp, having a DP of 1,050 and containing 6% of moisture, were dried to a moisture content of less than 1% and then added to 1,000 cm3 of DMSO containing 550 ppm of water and 94 g of 96% strength paraformaldehyde, corresponding to a formaldehyde/cellulose weight ratio of 1.20. The mixture was heated to 130° C. over the course of 1 hour with stirring, and was maintained at that temperature for 3 hours with constant stirring. Thereafter, a stream of dry nitrogen at 120° C. was bubbled through the solution, which was maintained at a temperature of 120° C., until the formaldehyde/cellulose weight ratio was reduced to 0.30.

The resulting solution, which had a viscosity of 2,100 poises at 20° C., had an Np value of 250 and an $I_c$ of 87. The solution was spinnable into filaments by conventional methods.

EXAMPLE 7

The procedure of Example 4 was repeated, but using 70 g of linters pulp, having a DP of 1,500 and containing 6% of moisture. The resulting paraformaldehyde/cellulose weight ratio was 1.37.

The resulting solution, which had a viscosity of 3,300 poises at 20° C., had an Np value of 100 and an $I_c$ value of 83. This solution could be spun into filaments using conventional techniques.

EXAMPLE 8

80 g of sulphate pulp, viscose grade, having a DP of 450 and a moisture content of 6%, which had been treated previously with liquefied ammonia, was dried to a moisture content of less than 1% and then introduced into 1,000 cm3 of DMSO containing 80 ppm of water. 54.8 g of 96% strength paraformaldehyde were added to this mixture, corresponding to a formaldehyde/cellulose weight ratio of 0.70. The mixture was heated to 130° C. in the course of one hour, with stirring, and maintained at that temperature for three hours with further stirring. The solution obtained, which was free of gels and undissolved fibers, had a viscosity of 550 poises and could be spun.

What is claimed is:

1. A spinnable, shapable solution of native cellulose in dimethylsulphoxide and formaldehyde, said cellulose having a degree of polymerization of at least 400 and a concentration in said solution of at least 6% by weight of cellulose per volume of dimethylsulphoxide, said formaldehyde present in a formaldehyde/cellulose weight ratio of about 0.2 to less than 0.8, said solution having a water content no greater than about 5000 ppm by weight.

2. Solution of claim 1, wherein said solution has a Np value less than 250 and a clogging index above 70.

3. Solution of claim 2, wherein said solution has a Np value no greater than about 200 and a clogging index of at least about 80.

4. Solution of claim 2, wherein the cellulose concentration of said solution is from about 8 to about 20% by weight of cellulose per volume of dimethylsulphoxide.

5. Solution of claim 4, wherein the water content of said solution is no greater than about 2000 ppm by weight.

6. Solution of claim 2, wherein the formaldehyde/cellulose weight ratio of said solution is between 0.2 and 0.6.

7. Process for producing spinnable, shapable solutions of native cellulose, said process comprising dissolving a native cellulose having a DP of at least about 400 and a moisture content below about 1% by weight in DMSO and formaldehyde at a formaldehyde/cellulose weight ratio of at least 1, and a concentration of cellulose of at least 6% by weight per volume of DMSO, the moisture content of the solution being no greater than 5,000 ppm by weight, and thereafter reducing the formaldehyde/cellulose weight ratio, to about 0.2 to 0.8.

8. Process of claim 7, wherein the DMSO has a water content of less than 1,000 ppm by weight.

9. Process of claim 8, wherein the formaldehyde/cellulose weight ratio during said dissolving is between 1 and 2.

10. Process of claim 8, wherein said cellulose has a DP of at least 1,000 and the DMSO has a water content of less than 500 ppm by weight.

11. Process of claim 8, wherein the formaldehyde is introduced into the DMSO in the form of paraformaldehyde.

12. Process of claim 8, wherein the formaldehyde/cellulose weight ratio is reduced to 0.2 to 0.6.

13. Process of claim 8, wherein 8 to 20 weight percent of cellulose is dissolved.

14. Process of claim 8, wherein the cellulose is dissolved at a temperature of about 90° to 130° C.

15. Process of claim 8, wherein the water content of said solution is less than 2,000 ppm by weight.

16. Process for producing spinnable, shapeable solutions of native cellulose, said process comprising dissolving a native cellulose having a DP of at least about 400 and a moisture content below about 1 percent by weight in DMSO and formaldehyde at a formaldehyde/cellulose weight ratio of at least one, and a concentration of cellulose of at least 6 percent by weight per volume of DMSO, the moisture content of the solution being no greater than 5000 ppm by weight, and thereafter reducing the formaldehyde/cellulose weight ratio by removal of formaldehyde from said solution until the formaldehyde/cellulose weight ratio is within the range of about 0.2 to less than 0.8.

* * * * *